_United States Patent Office_

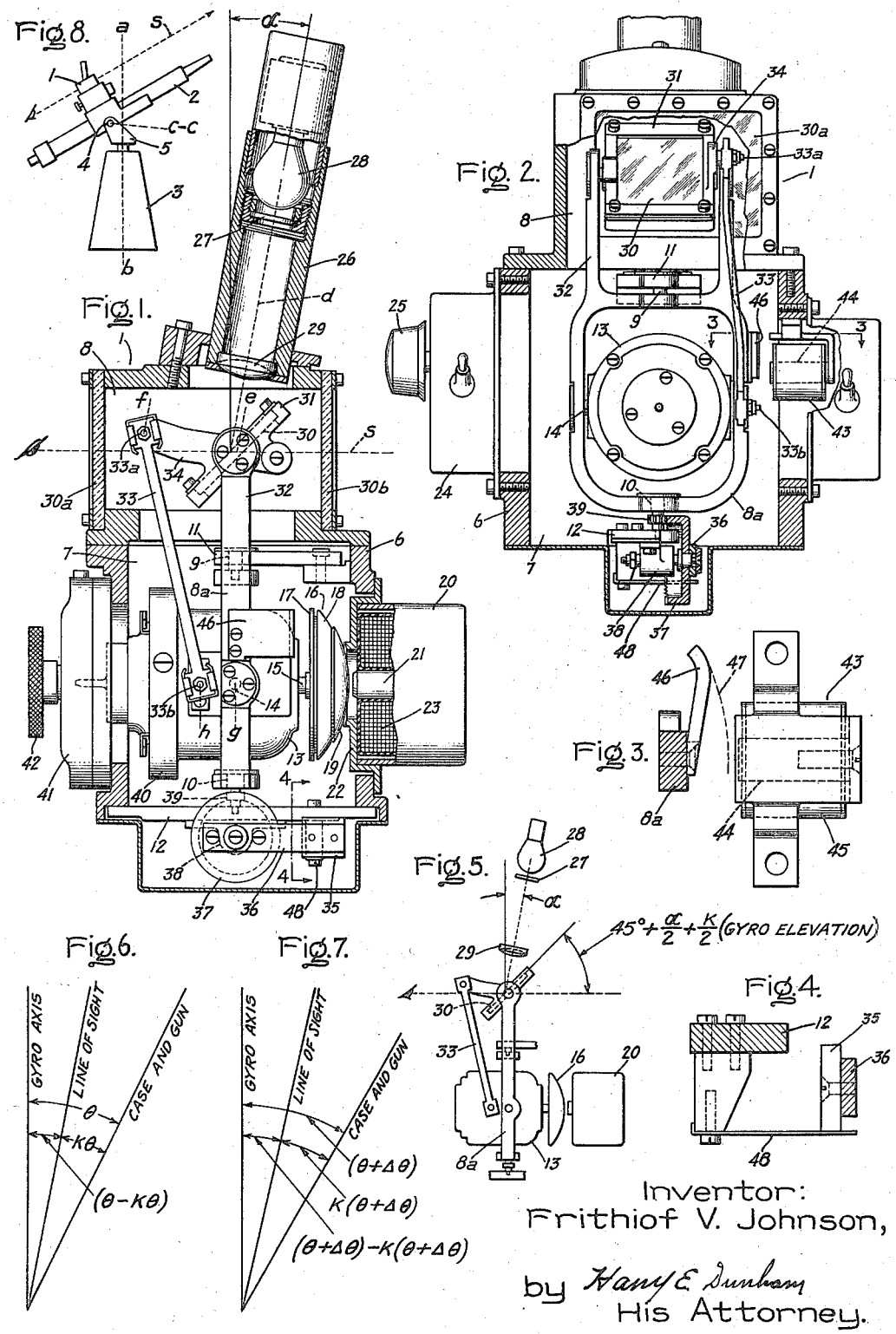

2,859,655
Patented Nov. 11, 1958

2,859,655
GUN SIGHTING MECHANISM HAVING GYROSCOPICALLY CONTROLLED TRANSPARENT MIRROR

Frithiof V. Johnson, Scotia, N. Y., assignor to General Electric Company, a corporation of New York Application April 25, 1944, Serial No. 532,607

3 Claims. (Cl. 88—2.4)

This invention relates to sighting mechanism, more particularly to sighting mechanism for use in the control of gunfire, and it has for its object the provision of improved mechanism of this character.

This invention relates to improvements in the general type of sighting mechanism described in my copending application, Serial No. 464,453, filed November 4, 1942, now Patent No. 2,550,482, and which application is assigned to the assignee of the present invention.

That application describes sighting mechanism which has a transparent reflector through which the target is observed; and an optical system including a reticle and optical means for generating a luminous image of the reticle and for projecting this image along an optical axis onto the reflector. The reflector in turn reflects the luminous image into the field of view of the observer and thereby generates or determines the line of sight. The reflector and optical system are mounted on a support which is moved in azimuth and elevation with the gun as the gun moves in azimuth and elevation. The gun itself, therefore, is used to control the direction of the line of sight and cause it to track the target.

Also mounted upon the support is a gyroscope which is free to move about a point of suspension. The gyroscope is connected to the reflector so that the spin axis of the gyroscope is always parallel to the line of sight, and further so that the position of the reflector relative to the support is controlled by the gyroscope as it moves relatively to the support.

The gyroscope is coupled to the support so that these members may be moved relatively to each other, but the coupling means is constructed and arranged to apply a torque to the gyroscope which is proportional to the magnitude of the displacement between the gyroscope and the support, and which torque tends to precess the gyroscope to bring its spin axis into a predetermined position with reference to the support. When the support is moving in order to cause the line of sight to follow a target, the gyroscope will be displaced from this predetermined relative position by an amount which is dependent upon the speed of the target, and also upon the strength of the coupling means between the gyroscope and the support. The coupling effect between the gyroscope and the support is controlled to give the gun the correct lead angle with reference to the line of sight as is made necessary by the speed of the target, and this is accomplished by controlling the torque generated by the coupling means in accordance with the time of flight of the projectile from the gun to the target.

In certain fire control applications, particularly those where the gun is mounted upon a swaying platform, such as on shipboard or on aircraft, this system has the following disadvantage: Since the spin axis and the line of sight are always in parallelism, if the gunner inadvertently moves his gun abruptly, or if the gun mount dips or shifts its position suddenly, so that the position of the gun is jerked from its correct position, for example, ahead of the correct position, the gyroscope momentarily will remain fixed, and hence the reticle image in the field of view also will remain fixed; that is, following an abrupt change in gun position it requires a definite length of time to change the reticle image position. Therefore, there is nothing to give the gunner an immediate indication of the error in his gun position. Stating it differently, an error in gun position merely increases the speed of the gyroscope and reticle image, and therefore, a finite time interval must elapse before such an error is shown.

In accordance with the present invention, I arrange the apparatus so that any motion of the gun which changes the angle between the gun and the gyroscope changes the position of the line of sight by a predetermined fraction of the amount of angular change, irrespective of the fact that the gyroscope momentarily remains fixed in position. I accomplish this by arranging the apparatus so that a ratio, other than 1:1, relates the motion of the gyroscope to that of the line of sight; that is, they are no longer in parallelism when the lead angle has any value other than zero. More specifically, this apparatus is so arranged that when the gyroscope moves through the angle $\theta$ in any plane, the line of sight moves through the angle $K\theta$ in the same plane, where K is any suitable value less than one. By reason of this arrangement, if the position of the gun be changed abruptly from its correct position, as ahead, the gyroscope momentarily will remain stationary, but the line of sight will be moved suddenly ahead through a predetermined fraction of the magnitude of the angle of error in the position of the gun, and thereby immediately give a visual indication that the gun position is erroneous.

For a more complete understanding of this invention, reference should be had to the accompanying drawing, in which Fig. 1 is a vertical sectional view illustrating the sighting device embodying this invention; Fig. 2 is an end elevation of the sighting device of Fig. 1, the major portion of the figure being shown in section; Fig. 3 is a sectional view taken through the line 3—3 of Fig. 2 and looking in the direction of the arrows, this figure being drawn to a larger scale than Fig. 2; Fig. 4 is a sectional view taken through the line 4—4 of Fig. 1 and looking in the direction of the arrows, this figure being drawn to a larger scale than Fig. 1; Figs. 5, 6 and 7 are diagrammatic views which will be used to demonstrate the principle of operation of the device; and Fig. 8 is an elevation view illustrating the relationship of the sighting device to a gun which it is used to control.

Referring to the drawing, this invention is shown in one form in connection with sighting apparatus of the type described and claimed in my above-mentioned copending application. It is shown in connection with a sighting device 1 intended to be used to control an automatic gun 2, and it is intended to determine for any firing problem the gun lead angle made necessary by the speed of the target. In the specific embodiment of the invention illustrated, the gun 2 is intended to be used on a ship against aircraft targets. It is mounted so that it may be moved in the train or azimuth axis a—b on a pedestal 3, and its trunnions 4 are mounted in a support 5 for movement of the gun in elevation about the axis c—c, which axis is perpendicular to the plane of the paper. The sighting apparatus 1 is rigidly secured to the gun so as to be moved in azimuth and elevation with it.

As will be fully described, the sighting device generates a line of sight and this line of sight is caused to track a target by moving the gun in azimuth on its pedestal 3 and in elevation on its trunnions 4.

Sighting device 1 comprises a metallic casing 6 defining a chamber 7, and a chamber 8 located above the chamber 7. Mounted within the chamber 7 is a gimbal ring 8a rotatably supported by shafts 9 and 10. The shaft 9 is journalled in a support 11, while the shaft 10 is journaled in a support 12. Pivoted to the gimbal ring 8a to move about an axis at right angles to the suspension axis of the ring is a gyroscope 13; the ring is provided with shafts 14 which mount the gyroscope for its movement.

The gyroscope 13 is provided with a gyroscope wheel shaft 15, which shaft is driven by any suitable high-speed motor (not shown), but which preferably will be a three-phase induction motor. As will be understood, the axis of the shaft 15 constitutes the spin axis of the gyroscope.

The shaft 15, as shown, projects from the gyroscope casing, and on its projecting end it carries an eddy-current disk 16. The eddy-current disk comprises a plate-like disk 17 which is rigidly secured to the shaft 15; this disk carries a plate 18 having an outer curved surface approximately in the form of a segment of a sphere which has its center in the center of suspension of the gyroscope. Spun over the outer curved surface of this member 18 is an electrically conducting sheet 19, which preferably will be made of copper.

Positioned opposite the eddy-current disk is a suitable electromagnetic device 20 fixedly mounted in the adjacent wall of the casing 6. The magnet 20 has a central pole 21 and an outer annular pole 22 between which poles is inserted a magnet energizing coil 23. The magnet 20 is mounted in the casing 6 so that the longitudinal axis of the center pole piece 21 passes through the center of suspension of the gyroscope; and the lengths and shapes of the poles 21 and 22 are such that their ends lie on a spherical surface having a center at the center of suspension of the gyroscope. Also, the magnet is so mounted that its axis is parallel to the gun bore.

The eddy-current disk 16 and the magnet 20 constitute a coupling between the gyroscope 13 and the casing 6, the eddy-current disk 16 constituting one coupling element mounted on the gyroscope, and the magnet constituting a second coupling element fixed to the frame 6. This coupling applies to the gyroscope a torque which always tends to precess it into alignment with the axis of the magnet in the event that the spin axis of the gyroscope be not in alignment with the axis of the magnet. In the operation of the coupling, when the eddy-current disk 16 is rotating in a magnetic field set up by the magnet, and the axis of the gyroscope is aligned with the axis of the magnet no eddy currents are induced in the disk which tend to precess the gyroscope. However, if the axis of the magnet departs from the axis of the disk, the motion of the disk under the magnetic poles causes eddy currents to flow in the copper sheet 19. A resulting electromagnetic force acts on the gyroscope which tends to precess it into alignment with the magnet's axis. The magnitude of this restoring force varies directly with the angle of departure of the gyroscope and the magnet, and with the coefficient of coupling which is a function of the magnet excitation current. This excitation of the magnet is controlled by means of a suitable rheostat 24 which is provided with a manually operable setting knob 25.

As has been fully described in detail in my above-mentioned copending application, the gyroscope will follow the motion of the magnet, irrespective of whether it moves in the traverse or azimuth plane, in the elevation plane, or in a slant plan which is a combination of azimuth and elevation movements.

The gyroscope is intended to control the line of sight of the sighting mechanism, and it is connected to a suitable optical system which generates the line of sight in such way that the position of the line of sight with reference to the frame or support 6 is controlled by the movement of the gyroscope with reference to this support.

The optical system, which generates the line of sight and which is controlled by the gyroscope, establishes a collimated line of sight. This optical system is mounted within a tubular member 26 which extends upwardly from that portion of the casing 6 which defines the upper chamber 8. Mounted within the tubular member 26 is a reticle 27 secured in fixed position in the tube. Any suitable reticle may be used; it may, for example be formed of glass which has its lower side silvered; in this silvered side there will be scribed an image, such as a cross or concentric circles or any other suitable image. Mounted in the tube 26 above the reticle 27 is a source of light 28, shown as an incandescent lamp. The light passing through the scribed part of the reticle is focused by a collimating lens 29. And in passing through this lens all of the light rays from any single point on the reticle are made parallel. The rays of light, which pass along the optical axis, indicated by $d$, pass through the reticle 27 to the lens 29, and strike an inclined transparent reflector member 30 which is in the form of a plain piece of glass, and which, as shown, is mounted in the chamber 8.

It will be understood that the reticle image defined by the optical system and projected onto the reflector 30 will be reflected by the reflector along a line $s$ which line is the line of sight. An observer looking from the left along the line $s$ will see the luminous reticle image in the field of view of the target, which image will appear to be at infinity. The chamber 8 is provided with transparent walls 30a and 30b opposite the two sides of the reflector, as shown, so that an observer positioned at the left may look through the reflector into the field of view and observe both the reticle image and the target.

The glass reflector 30 is mounted in a frame 31 which in turn is mounted in a fork-like extension 32 of the gimbal ring 8a. It will be observed, therefore, that the reflector 30 is rotated with the frame 8a when the gyroscope moves this frame relative to the support 6. The reflector frame 31 is also connected with the gyroscope by means of a link 33 which at its upper end, as viewed in Fig. 1, is pivoted at 33a to an arm 34 formed rigidly with the frame 31, and which has its lower end pivoted at 33b to the gyroscope at a point offset from the axis of movement of the gyroscope on its shafts 14. The pivot 33a is located distance $e-f$ from the axis of movement of the reflector, while pivot 33b is located distance $g-h$ from the axis of movement of the gyroscope. The gyroscope, therefore, as it moves upon its shafts 14 rotates the reflector.

In view of the foregoing, it will be observed that any motion of the gyroscope relative to the frame 6 will impart either a movement to the reflector 30 about the axis of movement of the gimbal 8a and the fork 32, or will rotate the reflector about its axis of movement in the fork 32 so as to displace the line of sight $s$ with reference to the axis of the magnet 20, and hence with the gun bore.

The sighting mechanism is mounted upon the automatic gun 2 so that the axis of the magnet 20 is parallel with the bore of the gun.

And as pointed out above, the gunner controls the line of sight, that is, the position of the reticle image by moving the gun in azimuth and elevation.

In the operation of the apparatus thus far described, it will be understood that the gunner will observe the target through the transparent wall members 30a and 30b and the transparent reflector 30, the eye of the gunner being indicated in Fig. 1 at the left of the transparent wall 30a. It will also be understood that the gunner moves the gun in azimuth or elevation or in both azimuth and elevation as required to keep the reticle image upon the target. It will also be understood that as the support 6 is moved in azimuth and elevation with the gun the gyroscope will lag behind the support by an amount which is dependent upon the speed of the gun, and the coupling coefficient between the gyroscope and the support 6, that is, between the eddy-current disk 16 and the magnet 20. The speed of the support 6, of course, measures the angular velocity of the target, and the coupling coefficient is adjusted by the resistance 24 in accordance with the time of flight of the projectile from the gun to the target so that the lag in the position of the gyroscope's spin axis behind the support 6 is the correct lead angle for the gun, as required by the speed of the target.

The displacement of the gyroscope's spin axis with reference to the support 6 is imparted to the line of sight $s$ because of the motion imparted by the gyroscope to the glass reflector 30. Therefore, in order to keep the reticle image on the target, the position of the gun 2 which is fixed to the support 6, necessarily will have to be advanced with reference to the line of sight, this angular advance of the gun being the correct lead, as required by the speed of the target.

The apparatus of my aforementioned copending application further comprises means for superimposing an elevation lead correction as required by the gun elevation and the range of the target, which correction is known as "superelevation." This correction is introduced by means of an unbalanced weight 35 mounted within the chamber 7. This weight is mounted upon an arm 36 which in turn is secured to a face gear 37. This face gear is mounted to rotate in a bearing 38 supported upon the bracket 12. The face gear meshes with a pinion 39 fixed to the gimbal ring 8a. The axis of movement of the weight 35 is parallel to the axis of the gun trunnions 4. This weight applies through the face gear 37 and the pinion 39 a torque to the eddy-current disk 16 in such a direction as to cause the gyroscope to precess in such a way as to depress the eddy-current disk 16 and thereby introduce the correction for "superelevation," in the fashion fully described in my above-mentioned copending application.

The apparatus further includes a nutation damper 40 positioned at the end of the gyroscope opposite the eddy-current disk 16. This nutation damper may be of any suitable type, but preferably will be of the type described and claimed in the copending application of Charles S. Grimshaw, Serial No. 487,309, filed May 17, 1943, now Patent No. 2,412,453, and which application is assigned to the assignee as this invention.

Also the gyroscope is provided with a suitable caging device 41 provided with a control knob 42 for caging and releasing the gyroscope.

As previously pointed out, in the sighting apparatus of my aforementioned copending application, the line of sight $s$ is maintained at all times in parallelism with the spin axis of the gyroscope. Therefore, if for any reason the position of the gun 2 be suddenly shifted from its correct position, the gyroscope and the line of sight will hold the reticle image momentarily fixed within the field of view, and there is nothing to indicate to the gunner that the gun has been abruptly shifted into an improper position.

Also as pointed out previously, in order to obviate this difficulty, I arrange the apparatus so that a ratio, other than 1:1, relates the motion of the gyroscope's spin axis to that of the line of sight $s$, whereby the spin axis and the line of sight are no longer parallel when the lead angle has any value other than zero. More specifically, this apparatus is arranged so that when the gyroscope moves through the angle $\theta$ in any plane, the line of sight $s$ moves through the angle $K\theta$ in the same plane, where K is less than one. Therefore, if the gun is moved abruptly—ahead of its correct position—by an angle $\Delta\theta$, the gyroscope momentarily remains fixed in direction, but the line of sight moves suddenly ahead through an angle $(1-K)\Delta\theta$, and hence shifts the reticle image in the gunner's field of view, this shift taking place concurrently with the shift in the gun's position. This gives the gunner an immediate signal that there is an error in the gun's position.

Assuming that the apparatus is so arranged that the motion of the gyroscope's spin axis to that of the line of sight is as just described, it will be understood by reference to Figs. 6 and 7 that if the gun 2 and the support 6 be steadily tracking a target and the gyroscope spin axis be lagging behind that of the gun bore by the angle $\theta$, then the position of the line of sight will be located between the gyroscope axis and the gun bore axis. The angle between the line of sight and the gun bore axis will be $K\theta$, while the angle between the line of sight and the gyroscope axis will be $\theta-K\theta$. Now if the gun be shifted abruptly forwardly by an angle equal to $\Delta\theta$, and the gyroscope remains momentarily fixed, then the angle existing between the gyroscope axis and the gun bore will be $\theta+\Delta\theta$, while the angle between the line of sight and the gun bore will be $K(\theta+\Delta\theta)$; therefore, the angle that now exists between the gyroscope axis and the line of sight will be $(\theta+\Delta\theta)-K(\theta+\Delta\theta)$.

Therefore, the change in the angular position of the line of sight due to the abrupt change in the position of the gun—the gyroscope axis remaining momentarily fixed—is:

$$[(\theta+\Delta\theta)-K(\theta+\Delta\theta)]-(\theta-K\theta)$$

which is $$\theta+\Delta\theta-K\theta-K\Delta\theta-\theta+K\theta$$

which is $$\Delta\theta-K\Delta\theta$$

or $$\Delta\theta(1-K)$$

Remembering that the value of K is always less than one, it will be observed that any movement of the gun and the support 6, which gives a change in the position between the gun bore and the gyroscope spin axis, will shift the line of sight in the direction of movement of the gun bore through an angle which will be a fraction of the amount of change in the angular position between the gun bore and the gyroscope axis.

For the azimuth movements of the gun and the line of sight, the proper ratio between the movement of the line of sight and the gyroscope is effected by properly positioning the optical system so that its optical axis $d$ is located at a predetermined angle $\alpha$ to the axis of movement of the frame 8a which, of course, is the azimuth axis for the reflector 30. It will be observed that the optical axis is tilted away from the gunner and in the direction of the line of sight $s$ leaving the reflector 30. More specifically, the casing 26 is inclined forwardly so that the optical axis $d$ is at an angle $\alpha$ to the azimuth axis of the reflector 30 and lies in a plane containing this azimuth axis and which plane is perpendicular to the reflector glass at zero value of lead, the elements being shown in this condition in Fig. 1. Putting it differently, at zero lead the optical axis $d$ lies in a plane containing the gyroscope's spin axis and the azimuth axis. The magnitude of the angle $\alpha$ will depend upon the value of K desired. This angle is not critical, but it may be shifted to any suitable value. In the specific example of the invention illustrated, K is given a value of about .75 so that the movement of the line of sight in azimuth is about one-quarter of the magnitude of the angular change in the azimuth position of the gun bore and gyroscope spin axis.

It will be observed that when the optical axis $d$ is thus angularly advanced with reference to the gunner, if the position of the gun 2 and the support 6 be abruptly shifted in a traverse plane, the optical axis $d$ also will be shifted, all while the gyroscope 13 and the reflector 30 momentarily remain fixed. When the optical axis $d$ is thus shifted, the line of sight $s$ leaving the reflector 30 necessarily will be shifted with the gun through an angle which is $\Delta\theta$—the change in position of the gun—times $(1-K)$.

In elevation, the ratio K is introduced into the connection means between the gyroscope 13 and the reflector 30. The ratio of the step-down linkage between the reflector 30 and the gyroscope—effected by properly proportioning the length of the distance $e-f$ to the length of the distance $g-h$ of the connection link pivots $33a$ and $33b$—is $$\frac{K}{2}$$

rather than $$\frac{1}{2}$$

as in the case of the apparatus described in my aforementioned copending application. Where this ratio is $$\frac{K}{2}$$

it will be observed that if the positions of the gun and support 6 be abruptly shifted about the gun's elevation axis, the gimbal ring $8a$ will, of course, be moved with the support—all while the gyroscope remains momentarily fixed—and, as a result the position of the reflector 30 necessarily will be changed; and hence the line of sight $s$ will be shifted in the elevation plane by an amount which is $\Delta \theta$ (the magnitude of the angular change) times $(1-K)$.

It should be noted here that the strength of the magnet 20 should be readjusted because of the foregoing changes which result in the foregoing control of the line of sight, as compared with the adjustment of the corresponding magnet in my aforementioned copending application wherein the line of sight and the gyroscope's spin axis always remain parallel. In the instant case, the strength of the coupling between the gyroscope and the magnet should be adjusted so that the gyroscope lags behind the support by an angle $$\frac{1}{K}$$

times as great as in the case of my aforementioned copending case. Then the line of sight will be displaced by the correct lead angle.

It is also to be noted that in order that the line of sight shall be parallel to the gyroscope's spin axis at zero lead, the angle of the reflector glass will be $$45° + \frac{\alpha}{2}$$

I have discovered that because of the aforedescribed inclination given to the optical axis, and because of the step-down ratio in the linkage between the reflector and the gyroscope, at relatively large azimuth angles there is introduced a slight error in the elevation position of the line of sight. I provide suitable means for compensating for this error. This means comprises a second electromagnetic coupling between the frame 6 and the gyroscope for correcting for the error in elevation due to large azimuth angles in one direction. This magnetic means comprises a fixed magnet 43 having a center pole 44 about which is a winding 45. This magnet, as shown, is located in a wall of the support 6 opposite one of the upright arms of the gimbal ring $8a$, as clearly shown in Fig. 2. Mounted upon this upright arm of the gimbal is an armature 46, the end of which moves along the dotted line indicated by 47 in a sweeping path into the magnetic field generated by the magnet 43. This armature is relatively remote from the magnet at zero lead, which is the relative positions of the gimbal ring $8a$ and the magnet shown in Fig. 3, and for small azimuth lead angles. However, for large azimuth lead angles in one direction, as where the upright arm of the bail $8a$ moves relative to the magnet 43 in a clockwise direction, as viewed in Fig. 3, then the armature moves closer and closer to the magnet. And as it does so, it exerts a torque on the gimbal $8a$ urging it in its direction of motion. This torque precesses the gyroscope about its shafts 14 and thereby corrects for the error in elevation.

For large azimuth angles in the other direction, a different means is used to apply the corrective torque to the gimbal ring $8a$. This means comprises a flat spring-like member 48 which is mounted below the "superelevation" weight 35 so as to apply a resisting force to its downward movement at large azimuth lead angles, and through the weight arm 36 and the gearing 37 and 39 apply the required correcting torque to the gimbal $8a$.

While I have shown a particular embodiment of my invention, it will be understood, of course, that I do not wish to be limited thereto since many modifications may be made, and I, therefore contemplate by the appended claims to cover any such modifications as fall within the true spirit and scope of my invention.

What I claim as new and desire to secure by Letters Patent of the United States is:

1. Gun sighting means comprising a movable support adapted to follow the movement of a gun as the gun moves about a predetermined axis, means for moving said support with said gun as the gun moves about said axis, a transparent sight reflector on said support mounted for movement with reference to said support on a sight axis corresponding to said axis of movement of said gun, optical means fixed on said support for generating an optical reticle image and for projecting it along an optical axis onto said reflector, said reflector directing it to define a line of sight said line of sight being moved to track a target by the movement of said support as it moves with said gun, a gyroscope on said support mounted for freedom of motion about an axis coincident with said sight axis and connected to said reflector so that the motion of said gyroscope about its said axis is imparted to said reflector, a yieldable coupling between said gyroscope and said support for applying a force to said gyroscope to cause it to precess to cause its spin axis to tend to follow the movement of said support on its axis in keeping said line of sight on a target, said gyroscope spin axis, however, lagging behind said support by an amount depending about the speed of said support and the magnitude of said force, and said optical axis being positioned at an angle to the common axis of movement of said gyroscope and said reflector and lying in a plane containing a common axis and said spin axis when there is zero lag between said spin axis and said support so that any motion of said gun and hence of said support which changes the amount of said lag changes the position of said line of sight by a predetermined fraction of the amount of said change.

2. Gun sighting mechanism comprising a movable support, means for moving said support in azimuth and elevation in a rigid system with the gun as the gun moves in azimuth and elevation, a transparent reflector on said support, an optical system fixed on said support including a reticle and means for generating a luminous image thereof and for projecting it along an optical axis onto said reflector which directs it as a line of sight into the target field of view, a frame movable on said support supporting said reflector for motion with the frame and with reference to said support on an azimuth axis, means mounting said reflector in said frame for motion on an elevation axis at right angles to said azimuth axis, a gyroscope mounted on said frame for motion on an axis parallel to said elevation axis of said reflector, a connection between said gyroscope and said reflector for moving said reflector on its elevation axis, said gyroscope controlling the direction of said line of sight both in azimuth and in elevation in accordance with the position of said gyroscope relative to said support, and said support being moved by said gun to move the line of sight in the target field of view in order to track a target, a yieldable coupling between said gyroscope and said support for applying to said gyroscope a precessing force which is proportional to the magnitude of the angular displacement between the spin axis of the gyroscope and said gun so as to cause said spin axis to tend to follow the movement of said support both in azimuth and elevation as the gun moves in azimuth and elevation, the spin axis however angularly lagging behind said support, the magnitude of the angular lag between said spin axis and said gun depending upon the speed of said gun and the magnitude of said force, and said connection means between said gyroscope and said reflector being constructed and arranged and said optical axis being so positioned that changes in the angle of departure between said gyroscope and said gun in both elevation and azimuth change the position of said line of sight in both elevation and azimuth by a predetermined fraction of said angle of departure.

3. Gun sighting mechanism comprising a movable support, means for moving said support in azimuth and elevation in a rigid system with the gun as the gun moves in azimuth and elevation, a transparent reflector, an optical system fixed on said support including a reticle and means for generating a luminous image thereof and for projecting it along an optical axis onto said reflector which directs it as a line of sight into the target field of view, a frame supporting said reflector for motion with the frame and with reference to said support on an azimuth axis, means mounting said reflector in said frame for motion on an elevation axis at right angles to said azimuth axis, a gyroscope mounted on said frame for motion on an axis parallel to said elevation axis of said reflector, a connection between said gyroscope and said reflector for moving said reflector on its elevation axis, said gyroscope controlling the direction of said line of sight both in azimuth and in elevation in accordance with the position of said gyroscope relative to said support, and said support being moved by said gun to move the line of sight in the target field of view in order to track a target, a yieldable coupling between said gyroscope and said support for applying to said gyroscope a precessing force to cause it to tend to follow the movement of said support both in azimuth and elevation as the gun moves in azimuth and elevation, the angular departure between said gyroscope and said gun depending upon the speed of said gun, means controlling the position of said line of sight so that any motion of said gun that changes the angle between the gun position and that of said gyroscope changes the position of said line of sight in both elevation and azimuth by a predetermined fraction of the amount of change in said angle, and means for applying a correction to the elevation position of said line of sight in accordance with the magnitude of the angular departure in azimuth between said gyroscope and said gun.

References Cited in the file of this patent

UNITED STATES PATENTS

| | | |
|---|---|---|
| 533,340 | Beehler | Jan. 29, 1895 |
| 1,032,022 | Petravic | July 9, 1912 |
| 1,724,093 | Kauch et al. | Aug. 13, 1929 |
| 1,936,442 | Willard | Nov. 21, 1933 |
| 1,939,517 | Paulus et al. | Dec. 12, 1933 |
| 1,984,874 | Gillmor et al. | Dec. 18, 1934 |
| 2,183,530 | Alkan | Dec. 19, 1939 |
| 2,356,189 | Tufts | Aug. 22, 1944 |
| 2,367,207 | Flint | Jan. 16, 1945 |

FOREIGN PATENTS

| | | |
|---|---|---|
| 130,048 | Great Britain | July 31, 1919 |
| 360,390 | Germany | Oct. 2, 1922 |
| 751,309 | France | June 19, 1933 |
| 666,562 | Germany | Oct. 24, 1938 |
| 50,247 | France | Oct. 17, 1939 |
| | (First addition to France 837,661) | |
| 538,422 | Great Britain | Aug. 1, 1941 |